No. 648,529. Patented May 1, 1900.
E. W. ROBINSON.
DYNAMO ELECTRIC MACHINE.
(Application filed Oct. 8, 1898.)

(No Model.)
2 Sheets—Sheet 1.

WITNESSES.
Edw. Williams Jr.
A. F. Macdonald.

INVENTOR.
Edward W. Robinson,
by Albert G. Davis
Atty.

No. 648,529. Patented May 1, 1900.
E. W. ROBINSON.
DYNAMO ELECTRIC MACHINE.
(Application filed Oct. 8, 1898.)
(No Model.) 2 Sheets—Sheet 2.

Witnesses
Edw Williams Jr.
A.F. Macdonald.

Inventor-
Edward W. Robinson,
by Albert G. Davis
Atty.

THE NORRIS PETERS CO., PHOTO-LITHO., WASHINGTON, D. C.

UNITED STATES PATENT OFFICE.

EDWARD WALLACE ROBINSON, OF SCHENECTADY, NEW YORK, ASSIGNOR TO THE GENERAL ELECTRIC COMPANY, OF NEW YORK.

DYNAMO-ELECTRIC MACHINE.

SPECIFICATION forming part of Letters Patent No. 648,529, dated May 1, 1900.

Application filed October 8, 1898. Serial No. 692,988. (No model.)

*To all whom it may concern:*

Be it known that I, EDWARD WALLACE ROBINSON, a subject of the Queen of Great Britain, residing at Schenectady, in the county of Schenectady, State of New York, have invented certain new and useful Improvements in Dynamo-Electric Machines, (Case No. 774,) of which the following is a specification.

My invention relates to the construction of dynamo-electric machines, and has for its object the improvement of their bearings and other mechanical parts.

Though applicable to various types of machines, I find my present improvements particularly useful in connection with those which are used as motors.

Figure 1:
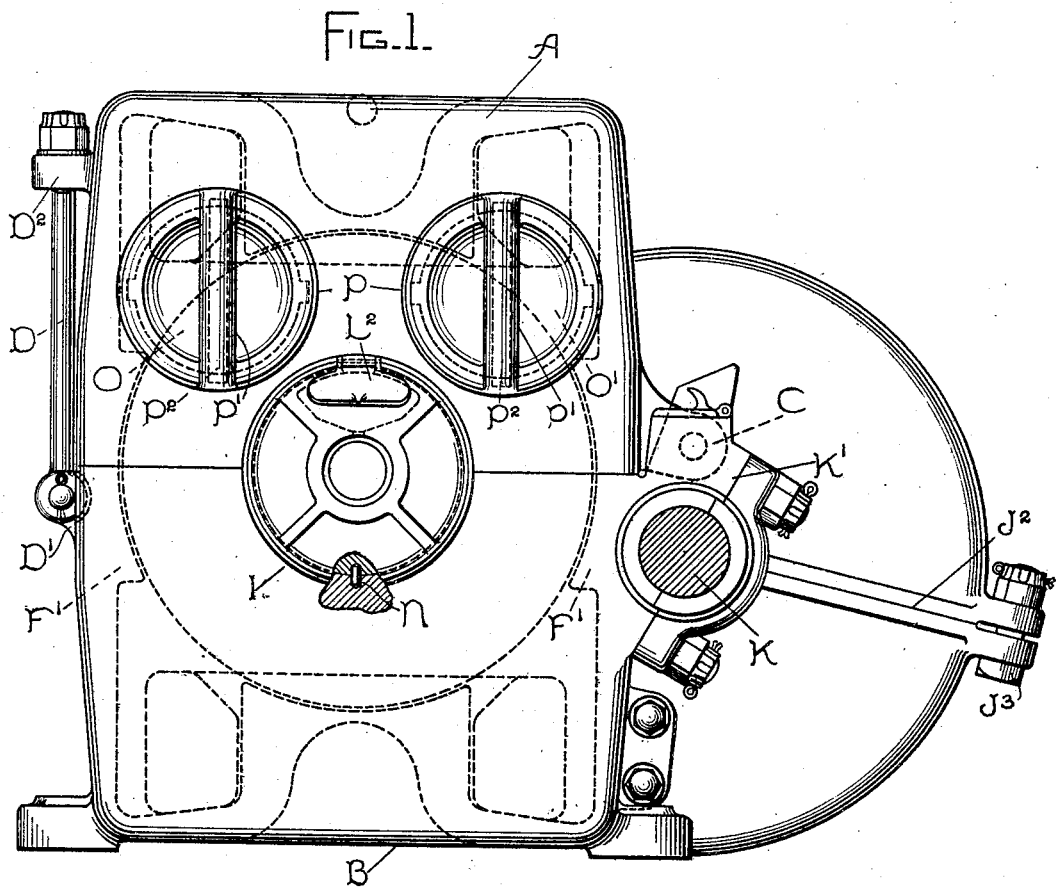
Figure 2:
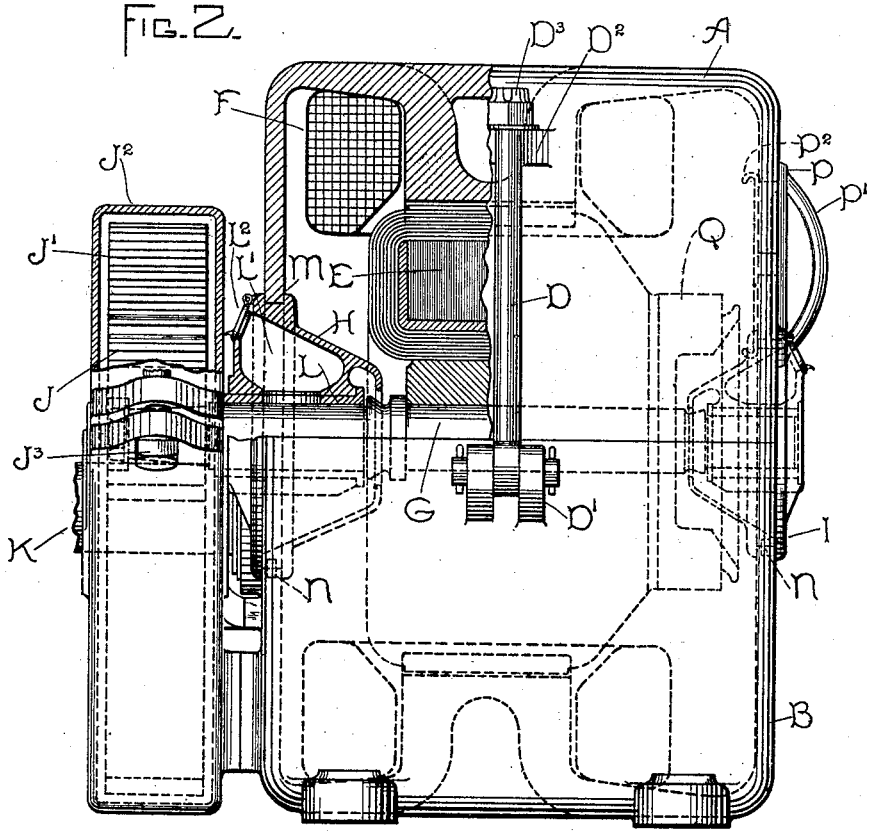

In the accompanying drawings, which illustrate an embodiment of my invention, Figure 1 is a side elevation of a dynamo-electric machine, and Fig. 2 is an end elevation with certain of the parts in section.

The field-magnet frame is divided into two parts A and B, which are fastened together at one end by hinges C and at the other end by a bolt D. In the particular form shown the field-magnet is split on a horizontal plane, with the upper and lower parts of the magnet substantially equal; but, if desired, any other plane of division may be used. The bolt D is pivotally supported on the lower field-frame by the lugs $D'$, and the upper end is arranged to pass between the lugs $D^2$ on the upper half of the frame and be secured by the nut $D^3$. Mounted for rotary movement within the field-magnet is an armature E of any desired type, the one shown being a Gramme ring. Situated above and below the armature and surrounding suitable pole-pieces are field-coils F, and formed on the front and back of the field-magnet frame and displaced by ninety degrees from the wound poles are salient poles $F'$, (shown in dotted lines in Fig. 1,) the line of division of the frame passing through these poles at or about the center. The armature is provided with a shaft G, which is mounted for rotary movement in the detachable bearings H and I, which in turn are mounted in semicircular openings formed in the parts of the magnet-frame, the opening in one part of the frame being opposite that in the other part. On the end of the shaft is a pinion J, meshing with a gear $J'$, which is mounted on the shaft K. The shaft K is mounted in bearings $K'$, formed on the back end of the lower field-frame. Surrounding the gears and supported in any suitable manner from the magnet-frame is a two-part gear-case $J^2$, the parts of which are secured together by the bolts $J^3$.

The armature-shaft bearings H and I are similar in their construction, so that a description of one of them will be sufficient. Each bearing is cast in a single piece and is provided with removable linings L and a pocket $L'$ for the reception of grease. A cover $L^2$ is hinged to the upper part of the bearing to close an opening formed in the pocket. On the periphery of the annular flange which forms a head for the bearing is cut a straight-sided groove M for the reception of the side walls of the upper and lower parts of the field-magnet frame. No bolts are employed to clamp the flange to the upper and lower parts of the frame, as has been the custom heretofore; but a pin or stud N (best shown in Fig. 1) is mounted in the lower part of the frame and enters a hole formed in the annular flange of the bearing.

It will be noticed that the bearing-surfaces are practically within the field-frame, which permits the gear-casing to be mounted in close proximity thereto. The arrangement of the bearing on the commutator end of the shaft is such that it projects under the commutator Q. It will be seen that a single bolt D serves both to clamp the bearings in place and to hold together the halves of the frame.

Situated on the commutator end of the machine are two openings or hand-holes O and $O'$, which permit access to the commutator and brushes. Each of these openings is provided with a removable cover P, having a handle $P'$. The openings O and $O'$ are slotted at two points, which points are diametrically opposite. These slots are intended to receive the ends of the flat-metal springs $P^2$, carried by the cover. The covers are first mounted in place with the springs opposite the slots and are then given a quarter-turn, (more or less,) and the springs clamp them in place.

To take the armature out, the clamping-bolt D is released and swung downward out of the way, the halves of the gear-case separated, and the upper half of the magnet-frame swung back. The armature can then be removed by the usual means, and the bearings H and I will be removed therewith. With this construction only one bolt is needed, and in replacing the armature and bearings no such difficulty is experienced as is sometimes found in the ordinary constructions when the bolt-holes in the cap do not match or come opposite the holes in the frame.

What I claim as new, and desire to secure by Letters Patent of the United States, is—

1. In a dynamo-electric machine, the combination of a shaft, bearings for the shaft provided with an angular flange, a divided field-magnet, and a bolt clamping parts of the field-magnet together, and at the same time retaining the bearings in place.

2. In a dynamo-electric machine, the combination of a divided magnet-frame hinged at one point, a rotating shaft, bearings for the shaft located practically within the main structure of the field-magnet frame, means for preventing the bearings from rotating with the shaft, and a single means for clamping the parts of the field together and also for securing the bearings in place.

3. In a dynamo-electric machine, the combination of a field-magnet frame divided into two parts, each provided with a semicircular opening, the opening of one part being directly opposite the opening in the other part, a bearing mounted within the opening, an annular flange having a groove cut in its periphery into which the sides of the frame project, a projection for preventing the bearing from turning, and a clamping-bolt for holding the two parts of the frame, and also for retaining the bearings in place.

4. In a dynamo-electric machine, the combination of an armature-shaft, bearings therefor, each bearing made in a single piece and provided with an annular flange, a rectangular groove for the reception of the sides of the field-magnet, an oil-receptacle formed in the bearing and communicating with the outside of the machine, a pin located in the grooved portion of the bearing for preventing the bearing from rotating, a two-part field-magnet frame, and a single bolt for clamping the two parts of the field-magnet together and holding the bearings.

5. In a dynamo-electric machine, the combination of a field-frame having a slotted hand-hole to permit the removal or adjustment of the commutator-brush, a cover for the hand-hole, and a flat spring mounted on the back of the cover and arranged to pass through the slots in the opening and retain the cover in place by engaging with the inside of the frame.

6. The combination with a dynamo-electric machine, of a field-magnet divided in a plane passing through the shaft of the machine, and a bearing for the shaft having a grooved periphery, which groove fits into a portion of the field-magnet in such a way that the bearing is locked in place against longitudinal displacement when the portions of the field-magnet are brought together and is released when the portions of the field-magnet are separated.

In witness whereof I have hereunto set my hand this 6th day of October, 1898.

EDWARD WALLACE ROBINSON.

Witnesses:
B. B. HULL,
M. H. EMERSON.